Aug. 6, 1929.  F N. NUTT  1,723,434
MOUNTING OF SPEEDOMETER FRAMES IN CASINGS
Filed Jan. 28, 1926
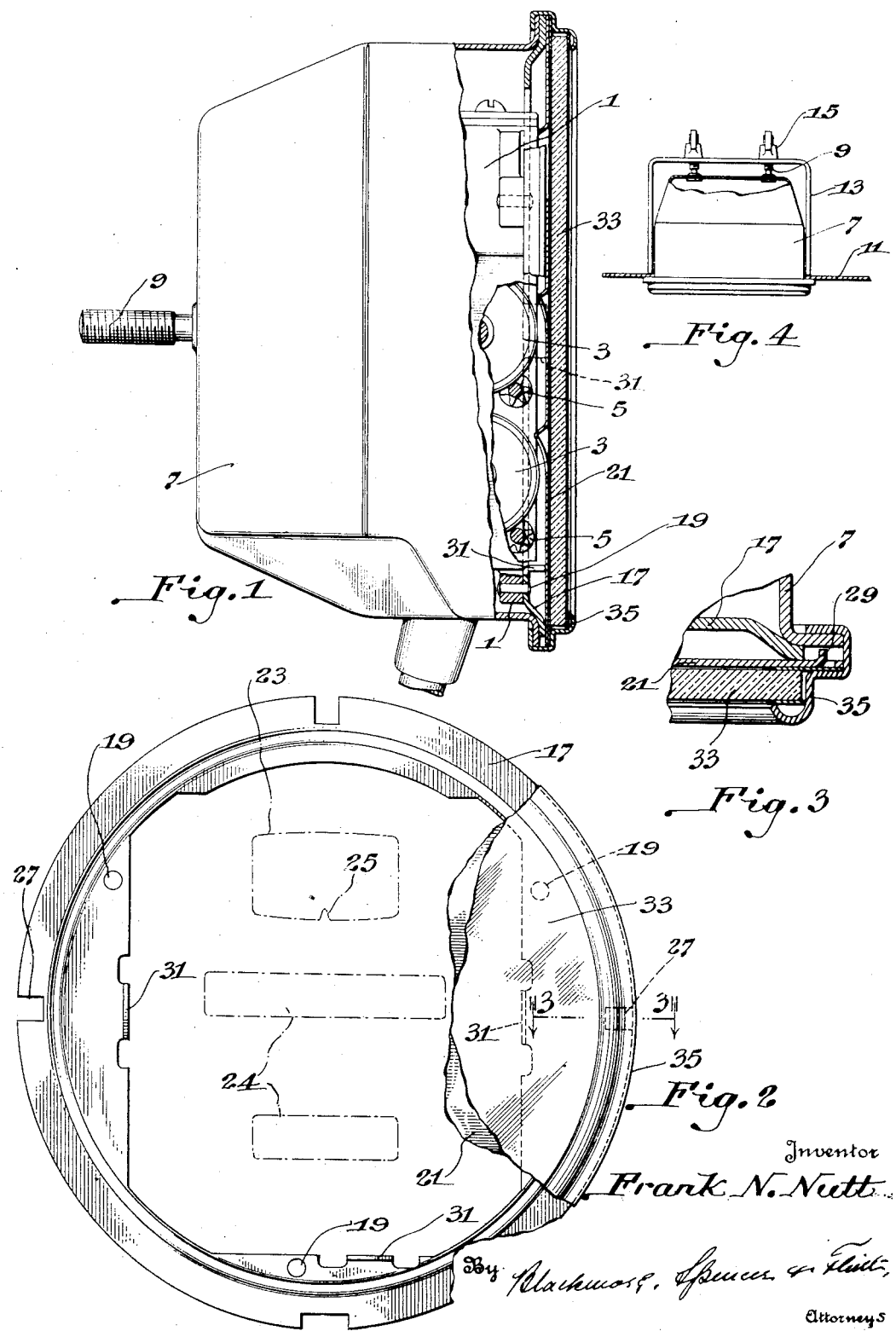

Patented Aug. 6, 1929.

1,723,434

UNITED STATES PATENT OFFICE.

FRANK N. NUTT, OF FLINT, MICHIGAN, ASSIGNOR TO A C SPARK PLUG COMPANY, OF FLINT, MICHIGAN, A COMPANY OF MICHIGAN.

MOUNTING OF SPEEDOMETER FRAMES IN CASINGS.

Application filed January 28, 1926. Serial No. 84,431.

This invention relates to measuring instruments. While its use is not restricted to the specific application herein shown, it has been designed primarily as an improvement in a speedometer for use on motor vehicles.

In motor vehicles a speedometer is placed upon the instrument board, usually by mounting the delicate instrument in a frame, securing the frame rigidly to a casing, and fixedly attaching this casing to the instrument board. The jolts and jars of a fast travelling automobile result in rather severe shocks to the measuring instrument.

It is an object of this invention to diminish largely the shocks transmitted to the measuring instrument. It aims to secure this result by interposing a resilient member between the casing which is secured to the instrument board and the instrument carrying frame which is within, but otherwise out of contact with the casing.

A further object of the invention is to support the instrument-carrying frame adjacent the front opening of the casing whereby the plane of the instrument support is substantially the plane in which the panel supports the casing.

Other objects are the provision of means to relieve the instrument frame from all strains, to control the clearance between the instrument face and the front of the mechanism, such as the odometer wheels, and to permit the use of a lighter casing. The invention also avoids the necessity of holding the cup depth to an accurate dimension and it facilitates quick and accurate assembly.

For a complete understanding of the invention, reference is made to the following specification and the accompanying drawing, in which Figure 1 is a side view of the instrument, a part being broken away and some parts being shown in section. Figure 2 is a front view, parts broken away. Figure 3 is a horizontal section on line 3—3 of Figure 2. Figure 4 is a broken view showing a clamping means which may be used.

Referring by reference characters to the drawing, numeral 1 represents a frame member within which is mounted the speedometer and odometer. These instruments constitute no part of the invention and are not at all fully illustrated. In Figure 1 there are shown two of the odometer wheels 3 and two of the star wheels 5. This frame member which carries the instruments is mounted in the casing 7. Inasmuch as the invention is concerned with a resilient connection between the casing and the frame it is important to connect the casing to the instrument board in such a way that the connecting means shall be unrelated to the speedometer frame. Referring to Figure 4 it will be seen that the casing member is provided with two screw bolts 9 extending from the rear thereof. The bezel of the instrument at the casing flange engages the front of the instrument board 11. There is provided a U-shaped clamp 13 which straddles the instrument and engages the rear face of the instrument board. Wing nuts engage over the threaded bolts, and when turned down against the U shaped clamp serve to draw the casing 7 firmly in position against the instrument board.

For the purpose of securing the instrument frame to the casing there is employed an annular member 17 which is more or less resilient in character. This resilient member is shaped on its inner contour to overlie parts of the frame to which it is secured by rivets or other fastening means 19. Overlying the resilient plate is a cover plate or dial plate 21. This dial plate has an opening 23 through which the speedometer speed cup is visible. It also has openings 24 through which the figure wheels of the odometer may be observed. At the lower edge of the opening 23 is a stud 25 which is used with the figures on the speed cup in reading the mileage. Inasmuch as stud 25 cooperates with the speed cup it is necessary that a fixed relationship shall exist between the dial plate and the instrument. To this end the resilient plate is provided with notches 27 at diametrically opposite points and the dial plate has struck up portions 29 which enter and fit the notches 27. If desired, the flange of the casing 7 may also be cut away so that the member 29 may engage in cooperating notches in the flange of the casing. It will be seen therefore that when the dial plate is placed in position with the parts 27 and 29 in proper engagement the dial plate is definitely fixed in relation to the resilient plate and to the instrument. In addition, since the instrument support is in a plane substantially the same as the plane in which the panel supports the casing, the speedometer mechanism is relieved from all strain. The spaced relation between the face plate, or dial plate, and the mechanism is definitely fixed because of the assembly of plate 17 and the dial plate together on the casing flange. If the instrument were secured elsewhere, as at the bottom of the cup, the casing would obviously have to be much stronger. By the arrangement for supporting the frame, it is quite immaterial if the cups are of different depth. Were the attachment of the instrument frame to the bottom of the cup, the depth would need to be very accurate in order to position the parts of the speedometer mechanism to be observed, such as the odometer wheels, adjacent the front face of the instrument and near the dial plate.

No quicker or more accurate assembly seems possible. It is only necessary to assemble the plates 17 and 21 upon the casing flange, together with the glass 33, and secure these parts by the usual bezel.

Instead of making the dial separate and securing it to the resilient plate by the means shown, it is quite possible, as a substitute construction, to make the two parts in the form of one integral plate. It is important also that the dial plate shall not come in contact with the speed cup or the rotating wheels of the odometer. For that purpose the resilent plate is provided with struck up members 31 which engage the under face of the dial plate and prevent any possibility of its contact with the number wheels of the instrument. Overlying the dial plate is the usual glass 33. For the purpose of clamping the outer periphery of the resilient plate and the dial plate to the flange of the casing member, 7, there is employed a bezel 35. It will be seen from the drawing that this bezel 35 has a rounded bead portion on the front engaging the glass cover and that its rear edge is clamped over the dial plate, the spring plate and the flange of the casing member 7. At the lower portion of the casing the casing flange and the two plates are provided with notches which are engaged by a struck up lug on the bezel, whereby the bezel is held in definite relation with these cooperating parts.

By the arrangement described above it will be seen that the instrument carrying frame is out of contact with its enclosing casing. The support for the frame is constituted by a resilient plate, which plate is secured to the frame and clamped to the casing member by the bezel. It therefore follows that shocks and jars to which the casing is subject, because of its clamped relation to the intrument board, will not be transmitted except to a far less extent to the instrument frame. That by means of the interengaging parts, assembly becomes a very simple matter, the notches and lugs insuring that the dial plate shall be in its correct position relative to the speed cup.

I claim:

1. In a measuring instrument, a casing having a front opening, an instrument frame within said casing, means to support said frame within said casing comprising an annular plate secured to said casing adjacent the plane of the front opening and means to secure said frame to said plate.

2. The invention set forth in claim 12, said plate being resilient.

3. In measuring instrument, a cup-shaped casing having a front opening, an annular plate positioned substantially in the plane of said opening, means to peripherally secure said annular plate to said casing, an instrument frame within said casing and means to secure said frame to said annular plate.

4. In combination, a supporting member, a casing of cup form having a front opening, means to secure said casing to said supporting member with its opening adjacent the plane of said supporting member, an instrument frame within said casing, means to secure said frame within and to said casing, said means engaging said casing adjacent its opening.

5. The invention set forth in claim 4, said last-named means being an annular plate carrying said frame and peripherally secured to said casing.

6. In a measuring instrument, a casing with a front opening, an instrument within said casing, means to secure said instrument within said casing, said means located substantially in the plane of said opening.

In testimony whereof I affix my signature.

FRANK N. NUTT.